US006422476B1

(12) United States Patent
Ackley

(10) Patent No.: US 6,422,476 B1
(45) Date of Patent: Jul. 23, 2002

(54) METHOD, APPARATUS AND CHARACTER SET FOR ENCODING AND DECODING DATA CHARACTERS IN DATA CARRIERS, SUCH AS RFID TAGS

(75) Inventor: H. Sprague Ackley, Seattle, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/375,912

(22) Filed: Aug. 17, 1999

Related U.S. Application Data

(63) Continuation-in-part of application No. 09/021,608, filed on Feb. 10, 1998, now Pat. No. 6,321,986, and a continuation-in-part of application No. 08/999,613, filed on Jan. 22, 1998, now Pat. No. 6,024,289, and a continuation-in-part of application No. 08/914,324, filed on Aug. 19, 1997, now Pat. No. 6,012,638, which is a continuation-in-part of application No. 08/842,644, filed on Apr. 16, 1997, now Pat. No. 6,149,059, which is a continuation-in-part of application No. 08/701,304, filed on Aug. 21, 1996, now Pat. No. 5,811,781, which is a continuation-in-part of application No. 08/295,382, filed on Aug. 24, 1994, now Pat. No. 5,557,092, which is a continuation-in-part of application No. 08/147,376, filed on Nov. 5, 1993, now abandoned.

(51) Int. Cl.⁷ .............................................. G06K 19/06
(52) U.S. Cl. ..................................... 235/494; 235/492
(58) Field of Search .............................. 235/492, 449, 235/382, 380, 494, 375, 493, 486, 487; 369/109, 59

(56) References Cited

U.S. PATENT DOCUMENTS

| | | | | |
|---|---|---|---|---|
| 3,906,460 A | * | 9/1975 | Halpern .................... | 340/172.5 |
| 4,056,710 A | | 11/1977 | Shepardson et al. ........ | 235/437 |
| 4,079,482 A | | 3/1978 | Yeh ............................. | 197/1 A |
| 4,307,293 A | | 12/1981 | Lazzarotti et al. .......... | 235/462 |
| 4,523,087 A | | 6/1985 | Benton ....................... | 235/379 |

(List continued on next page.)

FOREIGN PATENT DOCUMENTS

| | | |
|---|---|---|
| DE | 33 30 261 A1 | 3/1985 |
| EP | 0 667 592 A1 | 8/1995 |
| FR | 2 760 209 | 9/1998 |
| JP | 404345868 A * | 12/1992 |
| JP | 10040329 A | 2/1998 |
| WO | WO 95/12863 | 5/1995 |
| WO | WO 96/13803 | 5/1996 |
| WO | WO 98/47101 | 10/1998 |

OTHER PUBLICATIONS

"Bar Code Compression Decompression," *IBM Technical Disclosure Bulletin* 32:12, May 1990, pp. 228–290.
AIM USA, "Uniform Symbology Specification Interleaved 2–of–5", American National Standards Institute, Inc. Approved Aug. 16, 1995, pp.1–11.
AIM USA, "Uniform Symbology Specification Codabar", American National Standards Institute, Inc. Approved Aug. 16, 1995, pp.1–11.

(List continued on next page.)

*Primary Examiner*—Thien M. Le
(74) *Attorney, Agent, or Firm*—SEED IP Law Group PLLC

(57) ABSTRACT

A method, apparatus and computer-readable character set encodes a string of n-bit character codes corresponding to the data characters from an n-bit set of data characters in a data carrier as a string of m-bit character codes, where m is less than n. A method, apparatus and character set, decodes a string of m-bit character codes corresponding to the data characters from an m-bit set of data characters from a data carrier as a string of n-bit character codes, where m is less than n. The n-bit character set contains character codes corresponding to operations and operating modes such as compression modes to efficiently encode and decode data. The n-bit character set further includes character codes that indicate the presence or absence of companion data carries, and that standing alone or in combination with a modifier character code can indicate an operation to be performed on data in the companion data carrier.

28 Claims, 9 Drawing Sheets

U.S. PATENT DOCUMENTS

| | | | |
|---|---|---|---|
| 4,567,361 A | 1/1986 | Rosenthal | 235/462 |
| 4,575,621 A | 3/1986 | Dreifus | 235/380 |
| 4,589,144 A | 5/1986 | Namba | 382/61 |
| 4,701,746 A * | 10/1987 | Ueda et al. | 340/347 |
| 4,727,511 A * | 2/1988 | Sekiguchi | 364/900 |
| 4,728,784 A | 3/1988 | Stewart | 235/462 |
| 4,782,221 A | 11/1988 | Brass et al. | 235/494 |
| 4,786,792 A | 11/1988 | Pierce et al. | 235/456 |
| 4,792,910 A | 12/1988 | Lange | 364/519 |
| 4,794,239 A | 12/1988 | Allais | 235/462 |
| 4,810,867 A | 3/1989 | Speicher | 235/494 |
| 4,827,395 A | 5/1989 | Anders et al. | 364/138 |
| 4,841,128 A | 6/1989 | Gröttrup et al. | 235/491 |
| 4,845,351 A * | 7/1989 | Hara et al. | 235/492 |
| 4,916,296 A | 4/1990 | Streck | 235/454 |
| 4,970,712 A * | 11/1990 | Tsuruoka et al. | 369/109 |
| 4,980,544 A | 12/1990 | Winter | 235/436 |
| 5,025,415 A * | 6/1991 | Masuyama et al. | 365/52 |
| 5,051,569 A * | 9/1991 | Tsuruoka et al. | 235/454 |
| 5,097,263 A | 3/1992 | Delpech et al. | 341/155 |
| 5,128,526 A | 7/1992 | Yoshida | 235/456 |
| 5,184,005 A | 2/1993 | Ukai et al. | 235/472 |
| 5,204,515 A | 4/1993 | Yoshida | 235/456 |
| 5,216,233 A | 6/1993 | Main et al. | 235/472 |
| 5,280,159 A | 1/1994 | Schultz et al. | 231/382 |
| 5,298,731 A | 3/1994 | Ett | 235/494 |
| 5,324,922 A | 6/1994 | Roberts | 235/375 |
| 5,324,927 A | 6/1994 | Williams | 235/494 |
| 5,380,998 A | 1/1995 | Bossen et al. | 235/494 |
| 5,382,784 A | 1/1995 | Eberhardt | 235/472 |
| 5,387,783 A | 2/1995 | Mihm et al. | 235/375 |
| 5,389,770 A | 2/1995 | Ackley | 235/462 |
| 5,420,403 A | 5/1995 | Allum et al. | 235/375 |
| 5,434,401 A | 7/1995 | Bauser | 235/454 |
| 5,434,572 A | 7/1995 | Smith | 342/44 |
| 5,484,997 A | 1/1996 | Haynes | 235/492 |
| 5,489,908 A | 2/1996 | Orthmann et al. | 342/42 |
| 5,521,601 A | 5/1996 | Kandlur et al. | 342/44 |
| 5,528,222 A | 6/1996 | Moskowitz et al. | 340/572 |
| 5,539,191 A | 7/1996 | Ackley | 235/462 |
| 5,550,547 A | 8/1996 | Chan et al. | 342/42 |
| 5,552,591 A | 9/1996 | Bossen et al. | 235/462 |
| 5,553,084 A | 9/1996 | Ackley et al. | 371/37.1 |
| 5,557,092 A | 9/1996 | Ackley et al. | 235/462 |
| 5,563,402 A | 10/1996 | Reddersen et al. | 235/436 |
| 5,594,228 A | 1/1997 | Swartz et al. | 235/383 |
| 5,612,531 A | 3/1997 | Barkan | 235/462 |
| 5,619,027 A | 4/1997 | Ackley | 235/462 |
| 5,640,002 A | 6/1997 | Ruppert et al. | 235/472 |
| 5,673,037 A | 9/1997 | Cesar et al. | 340/825.54 |
| 5,761,219 A | 6/1998 | Maltsev | 371/37.01 |
| 5,763,867 A | 6/1998 | Main et al. | 235/472 |
| 5,764,867 A * | 6/1998 | Sato | 395/115 |
| 5,767,498 A | 6/1998 | Heske, III et al. | 235/463 |
| 5,777,310 A | 7/1998 | Liu et al. | 235/462 |
| 5,811,781 A | 9/1998 | Ackley | 235/462 |
| 6,000,613 A * | 12/1999 | Hecht et al. | 235/456 |
| 6,012,638 A | 1/2000 | Ackley et al. | 235/462.01 |
| 6,024,289 A | 2/2000 | Ackley | 235/494 |
| 6,149,059 A | 11/2000 | Ackley | 235/462 |
| 6,321,981 B1 * | 11/2001 | Ray et al. | 235/380 |

OTHER PUBLICATIONS

AIM USA, "Uniform Symbology Specification Code 93", American National Standards Institute, Inc. Approved Aug. 16, 1995, pp. 1–10.

AIM International, Inc., "International technical Specification—Symbology Identifiers", Jun. 18, 1998, Document Version 1.0, pp. 1–17.

AIM USA, "Uniform Symbology Specification Code 39", American National Standards Institute, Inc. Approved Aug. 16, 1995, pp.1–11.

AIM International, Inc., "International Symbology Specifications—Data Matrix," Nov. 1996, pp. 1–95.

AIM International, Inc., "International Symbology Specifications MaxiCode," Nov. 1996, pp. 1–44.

AIM USA, "Understanding 2D Symbologies," Copyright 1999, pp.1–49.

AIM USA, "Uniform Symbology Specification Code 128," American National Standards Institute, Inc., Approved Aug. 16, 1995, pp. 1–12.

AIM USA, "Uniform Symbology Specification Code 16K," American National Standards Institute, Inc., Approved Aug. 16, 1995, pp. 1–17.

AIM USA, "Uniform Symbology Specification Code 49," American National Standards Institute, Inc., Approved Aug. 16, 1995, pp. 1–26.

AIM USA, "Uniform Symbology Specification Code 93," Apr. 1993, pp. 1–10.

AIM USA, "Uniform Symbology Specification Code One," Jul. 1994, pp. 1–32.

AIM USA, "Uniform Symbology Specification PDF417," Jul. 1994, pp. 1–34.

Alphanumeric Data Compaction, Rev. C., Intermec Corporation, Everett, Washington, Jun. 1, 1992, 6 pages.

*Bar Code Print Quality—Guideline*, ANSI X3.182–1990, pp. 1–29.

*Codablock F (128)*, Bar Coding—Symbology Specification—Codablock, ICS International AG, 1993, pp. 1–44.

Dallas Semiconductor Corp., "50 Ways to Touch Memory," pp. 1–72.

Dallas Semiconductor Corp., "Dallas Takes the Memory Out of the Computer," pp. 1–14.

Dallas Semiconductor Corp., *Book of DS199x Touch Memory Standards*, Oct. 1992, pp. 1–159.

IPC–2D Symbology Specification, Sep. 7, 1997, pp. 1–7.

*Extended Channel Interpretation (ECI) Assignments*, Release 2, ECI Assignments, Aug. 1995, pp. 1–13.

*Information processing–8bit single–byte coded graphic character sets, Part 1: Latin alphabet No. 1*, ISO 8859–1, Feb. 15, 1987 (E), pp. 1–7.

*Information processing–8 bit single–byte coded graphic character sets, Part 4: Latin alphabet No. 4*, ISO 8859–4, Apr. 15, 1988 (E), pp. 1–5.

IPC–13 Symbology Specification (preliminary), Sep. 4, 1997, pp. 1–10.

IPC–14 Symbology Specification (preliminary), Sep. 1, 1997, pp. 1–9.

Palmer,R.C., "Symbologies," The Bar Code Book, 2d ed., Chapter 4, Helmers Publishing, Inc., New Hampshire, 1991, pp. 15–59.

Schuessler, *Using Extended Channel Interpretations (ECI's) for International Character Set Standardization*, Scan–Tech Proceedings, Chicago, Illinois, Nov. 1996, pp. 294–305.

*The Unicode Standard Worldwide Character Encodeing*, Ver. 1, vol. 1, The Unicode Consortium, Addison–Wesley Publishing Company, Inc., Massachusetts, pp. 1–6, 340.

Walker, "ASCII–Based Compaction Eases Bar–Code Decoder's Work," *Electronic Design 30* (22):163–166, Oct. 1982.

Patent Application No. 09/021/608 filed Feb. 10, 1998.

Patent Application No. 09/375,815 filed Aug. 17, 1999.

Patent Application No. 09/375,913 filed Aug. 17, 1999.

* cited by examiner

Character Assignments

| code | binary | data character | code | binary | data character |
|------|--------|----------------|------|--------|----------------|
| 00 | 0 0 0 0 0 0 | 0 | 47 | 1 0 1 1 1 1 | Extended Channel Interpretation, ECI |
| 01 | 0 0 0 0 0 1 | 1 | | | |
| 02 | 0 0 0 0 1 0 | 2 | 48 | 1 1 0 0 0 0 | Numeric Mode (3.3-bit) |
| 03 | 0 0 0 0 1 1 | 3 | 49 | 1 1 0 0 0 1 | Byte Mode (8-bit) |
| 04 | 0 0 0 1 0 0 | 4 | 50 | 1 1 0 0 1 0 | Word Mode (16-bit) |
| 05 | 0 0 0 1 0 1 | 5 | 51 | 1 1 0 0 1 1 | Function 1, FNC 1 |
| 06 | 0 0 0 1 1 0 | 6 | 52 | 1 1 0 1 0 0 | Associated Data Carrier |
| 07 | 0 0 0 1 1 1 | 7 | | | |
| 08 | 0 0 1 0 0 0 | 8 | | | |
| 09 | 0 0 1 0 0 1 | 9 | | | |
| 10 | 0 0 1 0 1 0 | A | | | |
| 11 | 0 0 1 0 1 1 | B | | | |
| 12 | 0 0 1 1 0 0 | C | | | |
| 13 | 0 0 1 1 0 1 | D | | | |
| 14 | 0 0 1 1 1 0 | E | | | |
| 15 | 0 0 1 1 1 1 | F | | | |
| 16 | 0 1 0 0 0 0 | G | | | |
| 17 | 0 1 0 0 0 1 | H | | | |
| 18 | 0 1 0 0 1 0 | I | | | |
| 19 | 0 1 0 0 1 1 | J | | | |
| 20 | 0 1 0 1 0 0 | K | | | |
| 21 | 0 1 0 1 0 1 | L | | | |
| 22 | 0 1 0 1 1 0 | M | | | |
| 23 | 0 1 0 1 1 1 | N | | | |
| 24 | 0 1 1 0 0 0 | O | | | |
| 25 | 0 1 1 0 0 1 | P | | | |
| 26 | 0 1 1 0 1 0 | Q | | | |
| 27 | 0 1 1 0 1 1 | R | | | |
| 28 | 0 1 1 1 0 0 | S | | | |
| 29 | 0 1 1 1 0 1 | T | | | |
| 30 | 0 1 1 1 1 0 | U | | | |
| 31 | 0 1 1 1 1 1 | V | | | |
| 32 | 1 0 0 0 0 0 | W | | | |
| 33 | 1 0 0 0 0 1 | X | | | |
| 34 | 1 0 0 0 1 0 | Y | | | |
| 35 | 1 0 0 0 1 1 | Z | | | |
| 36 | 1 0 0 1 0 0 | dash, -- | | | |
| 37 | 1 0 0 1 0 1 | period, . | | | |
| 38 | 1 0 0 1 1 0 | SPACE, sp | | | |
| 39 | 1 0 0 1 1 1 | $ | | | |
| 40 | 1 0 1 0 0 0 | / | | | |
| 41 | 1 0 1 0 0 1 | + | | | |
| 42 | 1 0 1 0 1 0 | % | | | |
| 43 | 1 0 1 0 1 1 | Shift 1, S1 | | | |
| 44 | 1 0 1 1 0 0 | Shift 2, S2 | | | |
| 45 | 1 0 1 1 0 1 | Shift 3, S3 | | | |
| 46 | 1 0 1 1 1 0 | Shift 4, S4 | | | |

*Fig. 1*

| 2A 39 | 2A 33 | 2A 79 | 2A 31 | 2A 32 | 2A 33 | 2A 34 | 2A 35 | 2A 41 | 2A 42 | 2A 43 | 32 3B |
|---|---|---|---|---|---|---|---|---|---|---|---|

| 09 | 03 | 46 | 18 | 48 | 06 | 29 | 04 | 48 | 10 | 11 | 12 | 50 | 07 | 12 | 07 |
|---|---|---|---|---|---|---|---|---|---|---|---|---|---|---|---|

9　3　SHFT4　IN NUMERIC MODE　A=6 B=29 C=4　OUT NUMERIC MODE　A B C　WORD MODE A=7 B=12 C=7　⟂

Full-ASCII encodation using shift characters

| ASCII CODE | ASCII DATA CHAR. | 93i | | ASCII CODE | ASCII DATA CHAR. | 93i | | ASCII CODE | ASCII DATA CHAR. | 93i | |
|---|---|---|---|---|---|---|---|---|---|---|---|
| 0 | NUL | [S2] | U | 44 | , | [S3] | L | 88 | X | X | |
| 1 | SCH | [S1] | A | 45 | - | - | | 89 | Y | Y | |
| 2 | STX | [S1] | B | 46 | . | . | | 90 | Z | Z | |
| 3 | ETX | [S1] | C | 47 | / | / | | 91 | [ | [S2] | K |
| 4 | EOT | [S1] | D | 48 | 0 | 0 | | 92 | \ | [S2] | L |
| 5 | ENQ | [S1] | E | 49 | 1 | 1 | | 93 | ] | [S2] | M |
| 6 | ACK | [S1] | F | 50 | 2 | 2 | | 94 | ^ | [S2] | N |
| 7 | BEL | [S1] | G | 51 | 3 | 3 | | 95 | _ | [S2] | O |
| 8 | BS | [S1] | H | 52 | 4 | 4 | | 96 | ' | [S2] | W |
| 9 | HT | [S1] | I | 53 | 5 | 5 | | 97 | a | [S4] | A |
| 10 | LF | [S1] | J | 54 | 6 | 6 | | 98 | b | [S4] | B |
| 11 | VT | [S1] | K | 55 | 7 | 7 | | 99 | c | [S4] | C |
| 12 | FF | [S1] | L | 56 | 8 | 8 | | 100 | d | [S4] | D |
| 13 | CR | [S1] | M | 57 | 9 | 9 | | 101 | e | [S4] | E |
| 14 | SO | [S1] | N | 58 | : | [S3] | Z | 102 | f | [S4] | F |
| 15 | SI | [S1] | O | 59 | ; | [S2] | F | 103 | g | [S4] | G |
| 16 | DLE | [S1] | P | 60 | < | [S2] | G | 104 | h | [S4] | H |
| 17 | DC1 | [S1] | Q | 61 | = | [S2] | H | 105 | i | [S4] | I |
| 18 | DC2 | [S1] | R | 62 | > | [S2] | I | 106 | j | [S4] | J |
| 19 | DC3 | [S1] | S | 63 | ? | [S2] | J | 107 | k | [S4] | K |
| 20 | DC4 | [S1] | T | 64 | @ | [S2] | V | 108 | l | [S4] | L |
| 21 | NAK | [S1] | U | 65 | A | A | | 109 | m | [S4] | M |
| 22 | SYN | [S1] | V | 66 | B | B | | 110 | n | [S4] | N |
| 23 | ETB | [S1] | W | 67 | C | C | | 111 | o | [S4] | O |
| 24 | CAN | [S1] | X | 68 | D | D | | 112 | p | [S4] | P |
| 25 | EM | [S1] | Y | 69 | E | E | | 113 | q | [S4] | Q |
| 26 | SUB | [S1] | Z | 70 | F | F | | 114 | r | [S4] | R |
| 27 | ESC | [S2] | A | 71 | G | G | | 115 | s | [S4] | S |
| 28 | FS | [S2] | B | 72 | H | H | | 116 | t | [S4] | T |
| 29 | GS | [S2] | C | 73 | I | I | | 117 | u | [S4] | U |
| 30 | RS | [S2] | D | 74 | J | J | | 118 | v | [S4] | V |
| 31 | US | [S2] | E | 75 | K | K | | 119 | w | [S4] | W |
| 32 | SP | SPACE | | 76 | L | L | | 120 | x | [S4] | X |
| 33 | ! | [S3] | A | 77 | M | M | | 121 | y | [S4] | Y |
| 34 | " | [S3] | B | 78 | N | N | | 122 | z | [S4] | Z |
| 35 | # | [S3] | C | 79 | O | O | | 123 | { | [S2] | P |
| 36 | $ | $ | | 80 | P | P | | 124 | | | [S2] | Q |
| 37 | % | % | | 81 | Q | Q | | 125 | } | [S2] | R |
| 38 | & | [S3] | F | 82 | R | R | | 126 | ~ | [S2] | S |
| 39 | ' | [S3] | G | 83 | S | S | | 127 | DEL | [S2] | T |
| 40 | ( | [S3] | H | 84 | T | T | | | | | |
| 41 | ) | [S3] | I | 85 | U | U | | | | | |
| 42 | * | [S3] | J | 86 | V | V | | | | | |
| 43 | + | + | | 87 | W | W | | | | | |

Note: Shift 1 denoted by [S1], Shift 2 denoted by [S2], Shift 3 denoted by [S3], Shift 4 denoted by [S4].

*Fig. 4*

METHOD, APPARATUS AND CHARACTER SET FOR ENCODING AND DECODING DATA CHARACTERS IN DATA CARRIERS, SUCH AS RFID TAGS

CROSS-REFERENCE TO RELATED APPLICATIONS

This application is a continuation-in-part of U.S. patent application Ser. No. 09/021,608, filed Feb. 10, 1998, now U.S. Pat. No. 6,326,886; U.S. patent application Ser. No. 08/999,613, filed Jan. 22, 1998, now U.S. Pat. No. 6,024,288, and U.S. patent application Ser. No. 08/914,324, filed Aug. 13, 1997, now U.S. Pat. No. 6,012,638; each of which was a continuation-in-part of U.S. patent application Ser. No. 08/842,644, filed Apr. 16, 1997, now U.S. Pat. No. 6,143,053; which was in turn a continuation-in-part of U.S. patent application Ser. No. 08/701,304, filed Aug. 21, 1996, now issued as U.S. Pat. No. 5,811,781; and which was in turn a continuation-in-part of U.S. patent application Ser. No. 08/295,382, filed Aug. 24, 1994, now issued as U.S. Pat. No. 5,557,092; which was in turn a continuation-in-part of U.S. patent application Ser. No. 08/147,376, filed Nov. 5, 1993, now abandoned. This application contains subject matter common to U.S. patent application Ser. No. 09/375,813, filed Aug. 17, 1999, entitled "COMPUTER READABLE CHARACTER SET FOR ENCODING DATA IN DATA CARRIERS, SUCH AS RFID TAGS" and to U.S. patent application Ser. No. 09/375,815, filed Aug. 17, 1999, entitled "METHOD, APPARATUS AND CHARACTER SET FOR ENCODING INFORMATION ABOUT ASSOCIATED DATA CARRIERS, SUCH AS RFID TAGS".

TECHNICAL FIELD

This invention relates to computer-readable character sets for encoding human-readable data characters in a data carrier such as an RFID tag, optical tag or touch memory device.

BACKGROUND OF THE INVENTION

Data carriers store computer-readable data or information as character codes that represent human-readable "data characters." Data characters include not only human readable characters, but also include special function characters such as start, stop or shift characters that provide certain functional data. Each data character is represented by a unique character code. The character code is typically a number, the numbers being assigned from 0 through a largest number. The largest number is determined by the number of bits in a computer's data path or bus. The computer typically employs a binary representation of the character code, although humans find a decimal or hexadecimal representation more convenient. A set or mapping of data characters and their corresponding character codes is commonly referred to as a "character set." The computer industry uses its own character encoding standards, for example, the American Standard Code for Information Interchange (ASCII) character set. Full ASCII defines a character set containing 128 data characters. Each data character in full ASCII is represented by a unique 7-bit character code ($2^7=128$).

The computer industry has grown beyond the limits of the full ASCII character set. As the computer markets have grown, the need has also arisen to support additional languages not defined by the full ASCII character set. New character sets were developed to accommodate clusters of characters in related languages. The original 7-bit full ASCII character set was expanded to 8 bits thus providing an additional 128 data characters. This additional 128 set of data characters (the "upper 128" or "extended ASCII") allowed for additional characters present in the related romance languages (i.e., French, German, Spanish, etc.) to be represented.

As the computer markets grew internationally, however, even more languages were required to be included in the character set. Particularly, the Asian markets demand a character set, usable on computers, which support thousands of unique characters. To uniquely define each of these characters, a 16-bit encoding standard was required.

Several 16-bit (two byte) encoding standards such as Unicode, Big Five, GB, KOR, JISC-6226-1983, and others have recently been developed. The Unicode character encoding standard is a fixed-length, uniform text and character encoding standard. The Unicode standard can contain up to 65,536 characters, and currently contains over 28,000 characters mapping onto the world's scripts, including Greek, Hebrew, Latin, Japanese, Chinese, and Korean. The Unicode standard is modeled on the ASCII character set. Unicode character codes are consistently 16 bits long, regardless of language, so no escape sequence or control code is required to specify any character in any language. Unicode character encoding treats symbols, alphabetic characters, and ideographic characters identically, so that they can be used in various computer applications simultaneously and with equal facility. Computer programs using Unicode character encoding to represent characters, but which do not display or print text, can remain unaltered when new scripts or characters are introduced. New computer operating systems are beginning to support these comprehensive 16-bit code standards, e.g., WINDOWS NT, manufactured by Microsoft Corporation of Redmond, Washington.

Often, it will be desirable to encode and decode character strings consisting of a combination of romance language data characters, including Arabic numerals, and data characters, including numerals, from Asian languages. Since the 16-bit character sets such as Unicode, GB and JISC-6226-1983, usually contain the one byte character sets (8-bit, 7-bit), such as extended or full ASCII, as subsets thereof, each of the romance and Asian language data characters can be represented by a double byte data character code selected from one of the 16-bit character sets. The double byte data character codes can be directly encoded into a memory of a data carrier, such as an RFID, optical tag or touch memory device. It is also possible to decode data from the memory, producing a set of double byte data character codes representing the information stored in the data carrier.

The substitution of double byte character codes for single byte data characters and the subsequent encoding of the substituted double byte character codes into a data carrier can use significantly more memory than would otherwise have been used had all of the single byte data characters been directly encoded into the data carrier as single byte character codes. Memory use is critical in many automatic data collection applications, especially when RFID or optical tags are employed. Therefore, there is a need to more efficiently represent and store a combination of data characters selected from single byte and double byte character sets in data carriers and other memory devices.

SUMMARY OF THE INVENTION

Under one aspect, a 6-bit character set 93i is defined to efficiently encode data characters. The character set employs single character codes and combinations of character codes to represent the 65,535 data characters of the 16-bit character sets. For example, the 93i character set includes a number of single character codes corresponding to "native" data characters and functions. The 93i character set further includes multiple shift characters to encode up to 128 data characters using pairs of character codes. The 93i character set also includes Extended Channel Interpretation, Numeric Mode, Word Mode, and Byte Mode compression schemes that employ character code combinations to encode the remaining data characters (at least 65,535), and that can result in even more efficient packing of data in a data string. Such compression schemes employ a set of variable values as part of an equation or equality. Efficient data packing can provide a number of benefits such as reducing the amount of memory required to store a given amount of information, or reducing the time required to transmit the information.

Under another aspect, a string of n-bit character codes is converted into a string of m-bit character codes, where m is less than n. For example, the n-bit character codes can be from a 16-bit character set (e.g., Unicode, GB, JISC-6226-1983), while the m-bit character codes are from a smaller character set (e.g., the 6-bit character set 93i). Customized m-bit character sets can be created for different applications, the customized m-bit character sets assigning single m-bit character codes to the data characters that predominate in the character strings ("native" data characters) common to the application. Thus, a significant proportion of the data characters represented by n-bit character codes can be represented by single m-bit character codes, resulting in a more effective packing of data in the string. This can be particularly advantageous where an external computer system employs a character set such as a 16-bit or 8-bit character set and the data must be stored in a relatively small amount of memory such as an RFID tag.

Under a further aspect, a string of m-bit character codes is converted into a string of n-bit character codes, where m is less than n. For example, a string of 6-bit character codes stored in a data carrier can be converted into a string of 16-bit character codes for use with a host computer operating with a 16-bit character set.

In yet an additional aspect, a writer such as an RF interrogator can encode the resulting m-bit character codes into a data carrier, such as an RFLD tag. Similarly, a reader such as an RF interrogator can decode m-bit character codes from the data carrier, creating an n-bit string of character codes corresponding to the data encoded in the data carrier. Thus, both romance and Asian language characters can be stored, read and manipulated in an efficient manner and the data can be used across a variety of platforms employing character sets of different sizes.

Additionally, the present invention embodies a computer-readable character set including functional data characters. These data characters, embedded in the character set, can cause a processor to execute a functions to control reading, writing, and/or manipulation of data. For example, the data characters can indicate a compression scheme for encoding or decoding a string of characters, such as Byte Mode, Numeric Mode, and Word Mode compressions schemes. Likewise, a Special Features Flag data character that can indicate the existence of a related or companion data carrier, typically located adjacent or near to the current data carrier. The Special Features Flag can additionally indicate a function or operation for a reader to perform.

BRIEF DESCRIPTION OF THE DRAWINGS

FIG. 1 is a table showing character codes and associated data characters for an exemplary 93i character set under the present invention.

FIG. 2 is an example of a schema of a memory of a data carrier, such as an RFID tag, storing a number of n-bit character codes.

FIG. 3 is an example of a schema of a memory of a data carrier, such as an RFID tag, storing a number of m-bit character codes.

FIG. 4 is a table showing the full ASCII (7-bit) character set.

DETAILED DESCRIPTION OF THE INVENTION

Figure 5:
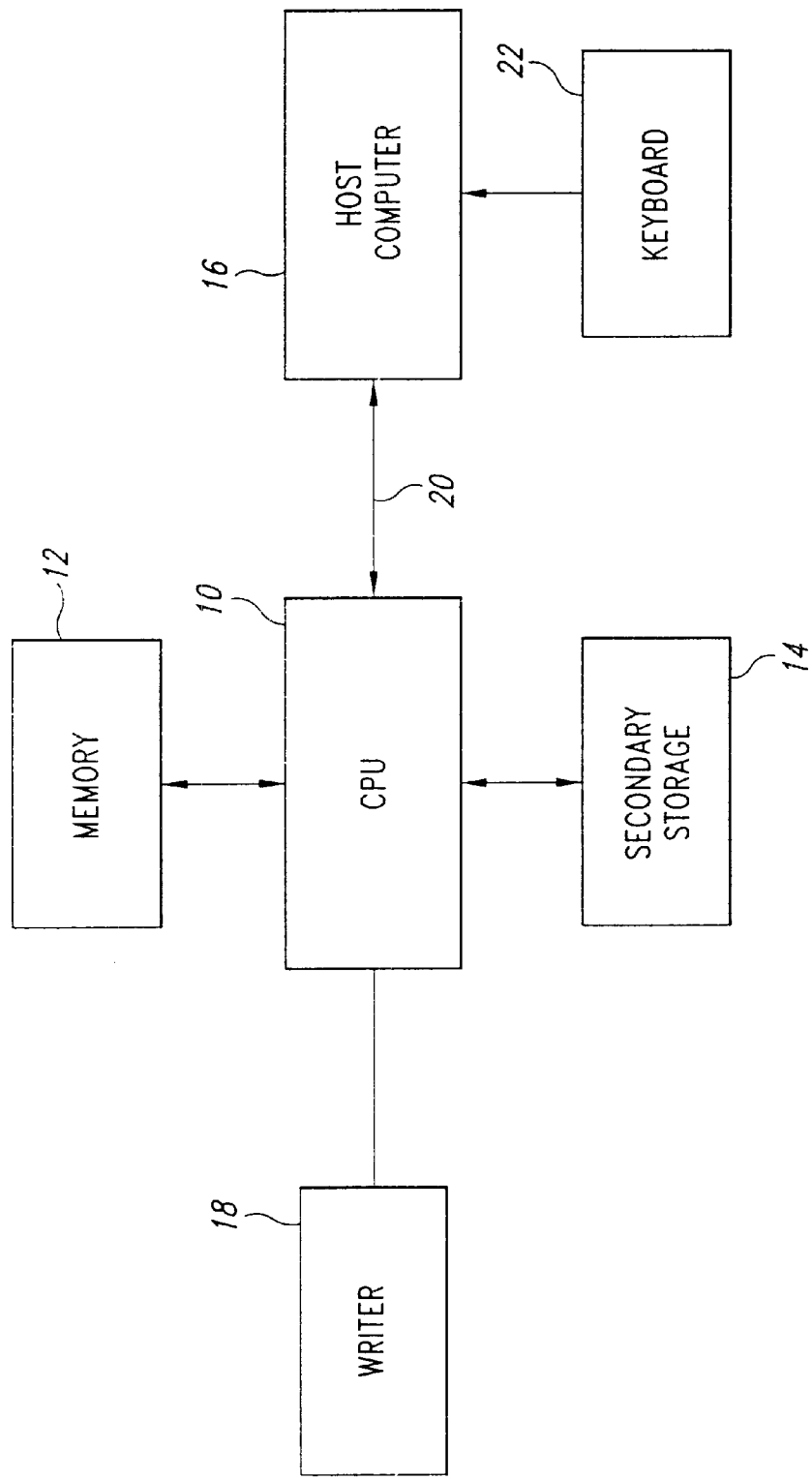
FIG. 5 is a block diagram of a memory device programming apparatus of the present invention.

As used generally herein, the following definitions apply: "data characters" refers to human readable characters, including symbols, numeric characters, alphabetic characters, pictographic and ideographic characters, as well as non-readable data, such as function codes, shift codes, etc.; "numeric string" refers to a sequence of numeric characters (e.g., decimal digits); "character codes" refers to a code, typically numeric, which refers to a data character within a set of character codes and corresponding data characters, such as ASCII, where "7-bit code" refers to an ASCII character code corresponding to a data character in the ASCII standard, and "16-bit code" or "16-bit character code" refers to a hexadecimal or decimal representation of a data character in a 16-bit character encoding standard, such as Unicode. For example, in the 16-bit character encoding standard Unicode, the data character "A" is represented by the 16-bit character code "0041" in hexadecimal notation and "65" in decimal.

FIG. 1 shows the character code assignments for each "native" data character (i.e., data characters that can be represented by a single character code) in a 93i character set. The 93i character set employs a 6-bit character code, and thus can be considered a 6-bit character set. Therefore, the 93i character set contains no more than 64 ($2^6$=64) native characters. The "Code" column in FIG. 1 represents the character code value in decimal notation for each of the corresponding data characters shown in the "Data Character" column. The 93i computer-readable character set is similar to the 93i machine-readable symbology disclosed in U.S. Pat. No. 5,557,092, and the applicant's currently pending and commonly assigned patent applications Ser. No. 08/842,644 filed on Apr. 16, 1997, and Ser. No. 08/914,324, filed on Aug. 19, 1997. In particular, the mapping between data characters and character codes in the symbology can be effectively employed in the character set.

While discussed in terms of decimal values, digital memories and processors typically employ a binary representation of the character codes to read, write, store and/or manipulate the corresponding data characters, as shown in the "Binary" column of FIG. 1. The value of the character codes are also employed in the various operating modes or data compression schemes discussed below. Computers typically represent data characters as definitions of printing and/or non-printing characters for display on a screen or for printing on a printer, e.g., bit-map, True-Type® (registered trademark of Apple Computer), and Post-Script® (registered trademark of Adobe Corporation) fonts.

Character sets typically employ a one-to-one mapping of data characters to character codes, and do not provide any character codes that map to functions or operations, such as shift codes or preceding codes. Thus, character sets capable of representing a large number of characters (i.e., greater than 256 characters) commonly employ 16-bit (double byte) characters codes. These character sets employ a double byte character code to represent each data character, even when the data character is present in a smaller character set, such as ASCII. The portion of the 93i character set shown in FIG. 1 includes ten character codes corresponding to functions and/or operations. For example, character codes 43–46 (decimal) correspond to shift operators, while character codes 46–50 correspond to different operating modes or compression schemes, as described below.

The 93i character set includes data characters (not shown) in addition to the native data characters shown in FIG. 1. These additional data characters are represented by respective combinations of character codes. For example, combinations composed of one of the character codes 43–46 (corresponding to one of the shift characters, Shift 1-Shift 4) and the other character codes 00–42 are assigned to a number of the data characters of the 16-bit character sets. Thus, the 93i character set is capable of representing at least 128 characters using single 6-bit character codes and combinations consisting of one 6-bit shift character code and one non-shift 6-bit character code. While additional shift character codes 43–46 can be assigned, such assignments reduce the number of non-shift character codes 00–42 available to pair with the shift character codes 43–46.

A variety of "compression" schemes can be employed to represent a larger number of data characters, and/or to represent data characters in a more compact manner. For example, compression schemes similar to the Extended Channel Interpretation, Word Mode, Byte Mode and Numeric Mode described in applicant's pending applications, Ser. Nos. 08/842,644 and 08/914,324 can be used to represent the at least 65,535 data characters typically found in the 16-bit character sets.

Under the Word Mode compression scheme, three 6-bit character codes are grouped so that their values encode a single 16-bit value. Thus, three 6-bit character codes (A, B, C) can encode Asian characters or 16-bit character codes (up to 65,536) under equation (1) below, where the sum of the equation is equal to the character code.

$$A*43^2+B*43+C \quad (1)$$

Similar equations can be worked out for larger character sets, or for smaller character sets, for example 5-bit character sets.

Encoding 16-bit characters such as Asian characters in 18 total bits initially appears to be less efficient than simply using two 8-bit character codes. However, such an approach can be efficient where native data characters from a relatively small character set (<8 bits) predominate the information or data. For example, on average 90% of the data characters for a particular application can consist of native characters from a 6-bit character set. In such a case, employing single 6-bit character codes for 90% of the data characters and three 6-bit character codes for the remaining 10% of the data characters can be more efficient than employing two 8-bit character codes for 100% of the data characters.

Under the Byte Mode compression scheme, the 93i character set efficiently encodes strings of full or extended ASCII data or straight byte data. A "byte" typically refers to an 8-bit set of data. Under the following equation (2), a double-byte, or two 8-bit bytes., are encoded for each of three symbol characters:

$$A*43^2+B*43+C \quad (2)$$

where A, B, and C are 93i symbol values between 0 and 42.

Under equation (2) two bytes having a combined value between 0 and 65,535 are encoded as two symbol characters (i.e., $2^{16}$=65,536). Values resulting from equation (2) between 65,536 to 75,535 encode four digits, while values 75,535 to 76,535 encode three digits. As a result, the Byte Mode provides a 3- and 4-digit numeric compression method to improve the information density for encoding strings of numeric characters while in Byte Mode. Values resulting from equation (2) between 76,536 and 79,506 are not defined, and cause a reader to fail a decode and output an error signal. While three 6-bit character codes (18 bits) is not as efficient as two 8-bit character codes (16 bits), it is more efficient than the four 6-bit character codes (24 bits) that would normally be required to represent two bytes in a 6-bit character set. (A 6-bit character set requires at least two character codes to represent all of the 256 characters represented in an 8-bit character set.) As discussed above, the 6-bit character set can overall be efficient where native data characters predominate. One of the extra characters (53–64) can be used to shift into the Byte Mode compression scheme.

In yet another compression scheme, Numeric Mode, five numeric digits are represented by three 6-bit character codes, where the character codes each have a value within the range of 0–47. The five digit numeric string is produced by the equation $$A*48^2+B*48+C \quad (3)$$

where A, B and C are 93i character code values. When a string of digits is encoded which is greater than five, but not an exact multiple of five, the following four rules should apply. First, one digit more than a multiple of five in a string is directly encoded by a single 6-bit character code (values 00–09). Second, if the numeric string contains two more digits than a multiple of five, the last seven digits are separated into a set of four digits followed by a set of three digits, which are each represented as described by the third and fourth rules below. Third, if a numeric string contains three digits more than a multiple of five, the three digits at the end of the string are represented by two 6-bit character codes according to the equation $$48*A+B \quad (4)$$

again, where A and B are 93i character code values. Fourth, if a numeric string contains four digits more than a multiple of five, the last four digits are encoded in three 6-bit character codes under equation (3) above, where the resulting value under equation (3) is between 100,000 and 109,999. One of the extra characters (53–64) can be used to shift into the Numeric Mode compression scheme.

In the 93i character set, character code values 47, 48, 49 and 50 cause the CPU to toggle into and out of Extended Channel Interpretation ("ECI"), Word Mode, Byte Mode and Numeric Mode, respectively. Additionally, other character code values can be used to shift into a 5-bit mode (alpha only), or a 10-bit mode (triple digits), or the set can employ a run length convention, such as a "group shift" that effects a predefined number of characters. It is important to note these character codes constitute overhead incurred in switching between modes, each mode switch requiring an extra character value 47–50. Switching modes is typically more efficient where strings of similar data characters occur in succession, for example where a string contains a number of consecutive non-native data characters. It is also important to note that existing character sets do not typically include character codes corresponding to functions, such as switching between compression modes. For example, full ASCII and extended ASCII already assign all of their available character codes to non-functional data characters. Similarly, existing character sets do not permit the switching from one representation to another (i.e., 16-bit→6-bit). Thus, while a processor could switch from 93i into an existing character set, such as ASCII or Unicode, the processor would be unable to switch back to the 93i character set.

FIG. 2 shows an exemplary schema of storing a number of n-bit character codes (n=16) in hexadecimal notation in a memory, along with the corresponding data characters shown beneath the respective n-bit character codes. Similarly, FIG. 3 shows an exemplary schema of storing a number of m-bit character codes (m=6) in decimal representation in a memory, along with the corresponding data characters shown beneath the respective m-bit character codes.

FIG. 4 shows the full ASCII character set and the corresponding 93i character code assignments for each of the ASCII data characters. The column "ASCII Code" in FIG. 3 represents the ASCII character code assigned to the respective data character shown in the column "ASCII Data Character." The "93i" column includes the one or two 93i data characters that correspond to the respective ASCII data characters.

FIG. 5 shows an exemplary embodiment of a system that encodes a string of n-bit character codes into a memory as a string of m-bit character codes. The system includes a CPU 10, a memory 12 and secondary storage 14 coupled to the CPU 10. The CPU 10 is in data communication with a 16-bit host computer 16 and a writer 18. The writer 18 is of a type generally known which can program data carriers, such as an RF interrogator. The writer 18 will also typically be capable of reading from the data carrier. Those skilled in the art can select from any such writers which are suitable for use in the present invention. The CPU 10 is electrically coupled to a host computer 16, or other apparatus or applications, by a port or line 20.

The host computer 16 is generally capable of working only with an n-bit character set, such as 16-bit data character encoding standards (i.e., Unicode, JISC-6226-1983, Big Five, GB, or KSC 5609-1987). The JISC-6226-1983 standard is the Japan Industrial Standard Character set, mapping the kanji and katakana data characters into 16-bit codes. This data character standard is similar to Unicode in many respects, which, as noted above, includes the kanji and katakana data characters, among others.

The host computer 16 transmits a string of 16-bit character codes to the CPU 10 along the line 20. The string of 16-bit character codes can be or may have been generated from a keyboard 22 which is associated with the host computer 16 for entering data therein. When a key is depressed on the keyboard 22, the keystroke is converted into a "scan code" which is transmitted from the keyboard 22 to the device to which the keyboard is connected (e.g., the host computer 16). This scan code represents the particular key of the keyboard which has been depressed. The device to which the keyboard is connected translates the appropriate scan codes into corresponding character codes in the resident data character set, such as ASCII on an 8-bit machine or Unicode on a 16-bit machine.

Upon receipt of the string of 16-bit character codes, the CPU 10 executes a set of instructions 26 stored in the memory 12 to convert the character codes into an optimized set of m-bit character codes such as 6-bit character codes (i.e., 93i).

The writer 18 interprets these character codes and produces an appropriate signal to program the m-bit character codes into the memory device. For example, the writer 18 can generate an RF signal, including any required polling code, to program an RFID tag. As used herein, the term "RF" includes any frequency in the electromagnetic spectrum, but generally between 1 kHz and 100 GHz may be typical. Alternatively, the writer 18 can generate an optical signal to program an optical tag, or an electrical signal to program a touch memory device. Those skilled in the relevant art will recognize that the type of signal is determined by the type of memory device.

Figure 6:
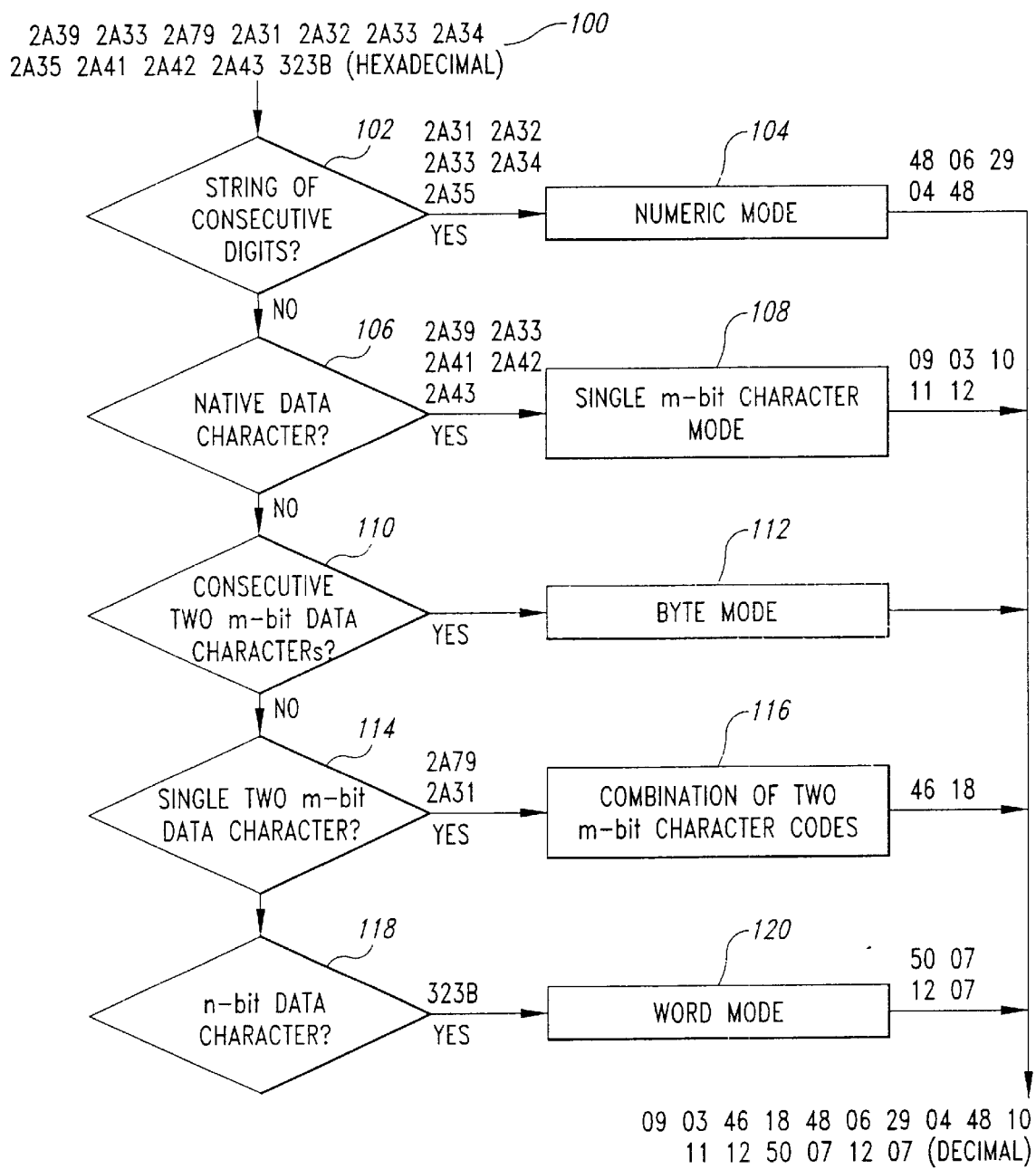
FIG. 6 is an exemplary flow chart showing the basic steps performed by the programming apparatus of FIG. 4 for writing to memory devices under the exemplary embodiment.
Figure 9:
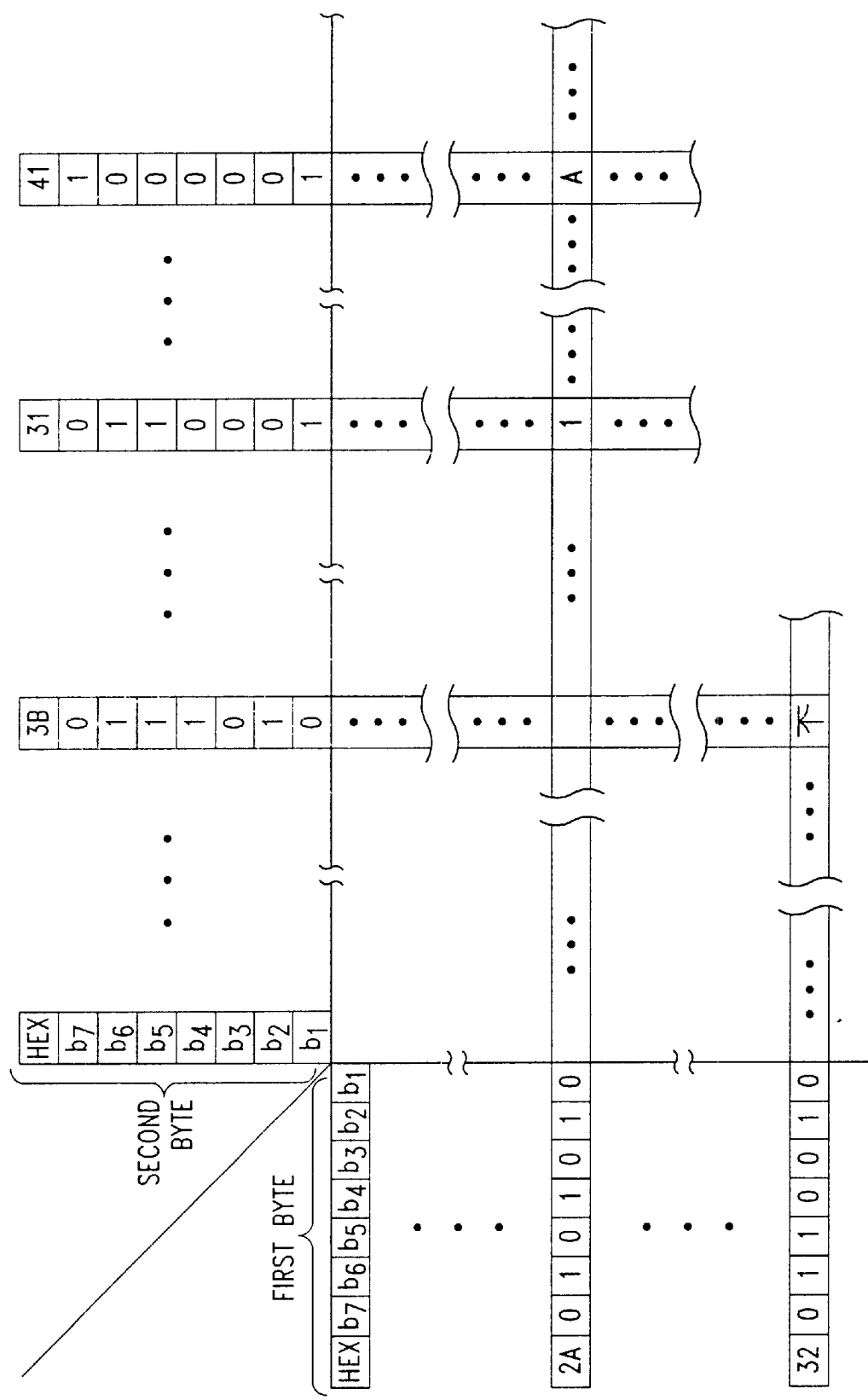
FIG. 9 is a table showing the mapping between data characters and character values in hexadecimal and binary for selected characters from the GB character set.

FIG. 6 shows exemplary steps performed by the CPU 10 under the set of instructions 26 for programming a memory device to encode a string of n-bit character codes corresponding to data characters from an n-bit character set as multiple m-bit character codes where m is less than n. In the example of FIG. 6, the data characters are: "9" "3" "i" "1" "2" "3" "4" "5" "A" "B" and "C" selected from the romance language characters, and a character selected from an Asian language represented in the GB character set which is approximately pronounced as "Bu" in Mandarin. FIG. 9 is a table which shows the data characters "1", "A" and "Bu" along with their respective character values in the GB character set. The character values are composed of a first byte of seven binary digits and a second byte of seven binary digits. As shown in FIG. 9, each byte can be represented by two hexadecimal characters.

With continuing reference to FIG. 5, in step 100, the string of n-bit (16-bit) characters codes (i.e., "2A39 2A33 2A79 2A31 2A32 2A33 2A34 2A35 2A41 2A42 2A43 323B" Hexadecimal) is received from the host computer 16. The CPU 10 sequentially examines individual character codes and sets of the character codes to determine an efficient m-bit representation. For example the CPU 10 can "look ahead" to determine whether a particular character code is one of a consecutive sequence of similar character codes, such as character codes representing digits.

In step 102, the CPU 10 determines whether the character code is part of a string of digits. If the character code is part of a string of digits, the CPU 10 employs Numeric Mode 104 to efficiently encode the string of digits according to the rules explained above in reference to Numeric Mode and according to the teachings incorporated herein by reference. Thus, when the CPU 10 encounters a string "2A31 2A32 2A33 2A34 2A35" (Hexadecimal) corresponding to the consecutive data characters "1 2 3 4 5" (Decimal), the CPU 10 produces an output string "48 06 29 04 48" (Decimal). The first occurrence of the character code 48 toggles into Numeric Mode, while the second occurrence of the character code 48 toggles out of Numeric Mode. The character codes 06, 29, and 04 correspond to the variable values A, B and C, respectively, and thus the equality (3) produces the value 12,345 (Decimal). The individual digits of the value 12,345 produce the string "1" "2" "3" "4" "5."

In step 106, the CPU 10 determines whether the n-bit character code corresponds to a native data character from the m-bit character set. For example, in the 93i character set (FIG. 1) each of the data characters 0–9 and A–Z, can be represented by a single 6-bit character code, having values 00–35, respectively. While 93i defines one exemplary character set, one skilled in the art can develop other character sets based on the teachings of the present application, that map the most frequently occurring characters to the single m-bit character codes. Where an n-bit character code corresponds to a native data character, the CPU 10 in step 108 produces a corresponding single m-bit character code. For example, each of the n-bit character codes "2A39" "2A33" "2A41" "2A42" "2A43" (Hexadecimal), corresponding to the data characters "9" "3" "A" "B" and "C", respectively, is represented as the m-bit character codes "09" "03" "10" "11" and "12" (Decimal), respectively.

In step 110, the CPU 10 determines whether there are consecutive n-bit character codes that correspond to data characters that can be represented by pairs of m-bit character codes. If such exists, the CPU 10 in step 112 encodes such under the rules of Byte Mode, as explained above and in the teachings incorporated herein by reference.

In step 114, the CPU 10 determines whether the character code corresponds to a data character that can be represented by a combination such as a pair of m-bit character codes. If so, in step 116 the CPU 10 produces a combination of m-bit character codes corresponding to the data character. For example., the n-bit character code "2A79" corresponds to the data character "i". While the data character "I" is native to the 93i character set, the data character "i" is represented by a shift data character SHIFT4 followed by the data character "I". Thus, the CPU 10 produces the m-bit character code combination "46 18" (Decimal).

In step 118, the CPU 10 determines whether the character code corresponds to a data character that can only be represented in Word Mode. The CPU 10 in step 120 encodes the n-bit character code under the rules of Word Mode, as explained above and in the teaching incorporated herein by reference. For example, the n-bit character code 323B corresponds to an Asian data character that cannot be represented using the shift codes in the 93i character set. Thus, the equality (1) is set equal to the value of 323B (Hexadecimal) and solved for the variable values A=07, B=12, C=07. The CPU also produces the character code 50 corresponding to a toggle into Word Mode.

The CPU 10 can employ look-up tables or parsing techniques to relate n-bit character codes to single m-bit character codes and combinations of m-bit character codes. Since many of the 16-bit standards encode subsets of data characters, such as ASCII, at predefined offsets in memory, these data characters are easily identified using parsing techniques. Data parsing techniques are well known in the relevant art. For example, an n-bit character set can employ character codes that contain the value 2A (Hexadecimal) in the upper byte for every ASCII character, a value equal to the m-bit character code in the lower byte for data characters that are common to both the n-bit and m-bit character sets. As few as a single bit can be used to identify the character code for parsing. One skilled in the art will realize that it does not matter which set of character codes is parsed from the string or the manner in which the parsing is performed, so long as the character codes corresponding to the different character sets can be operated on separately.

Figure 7:
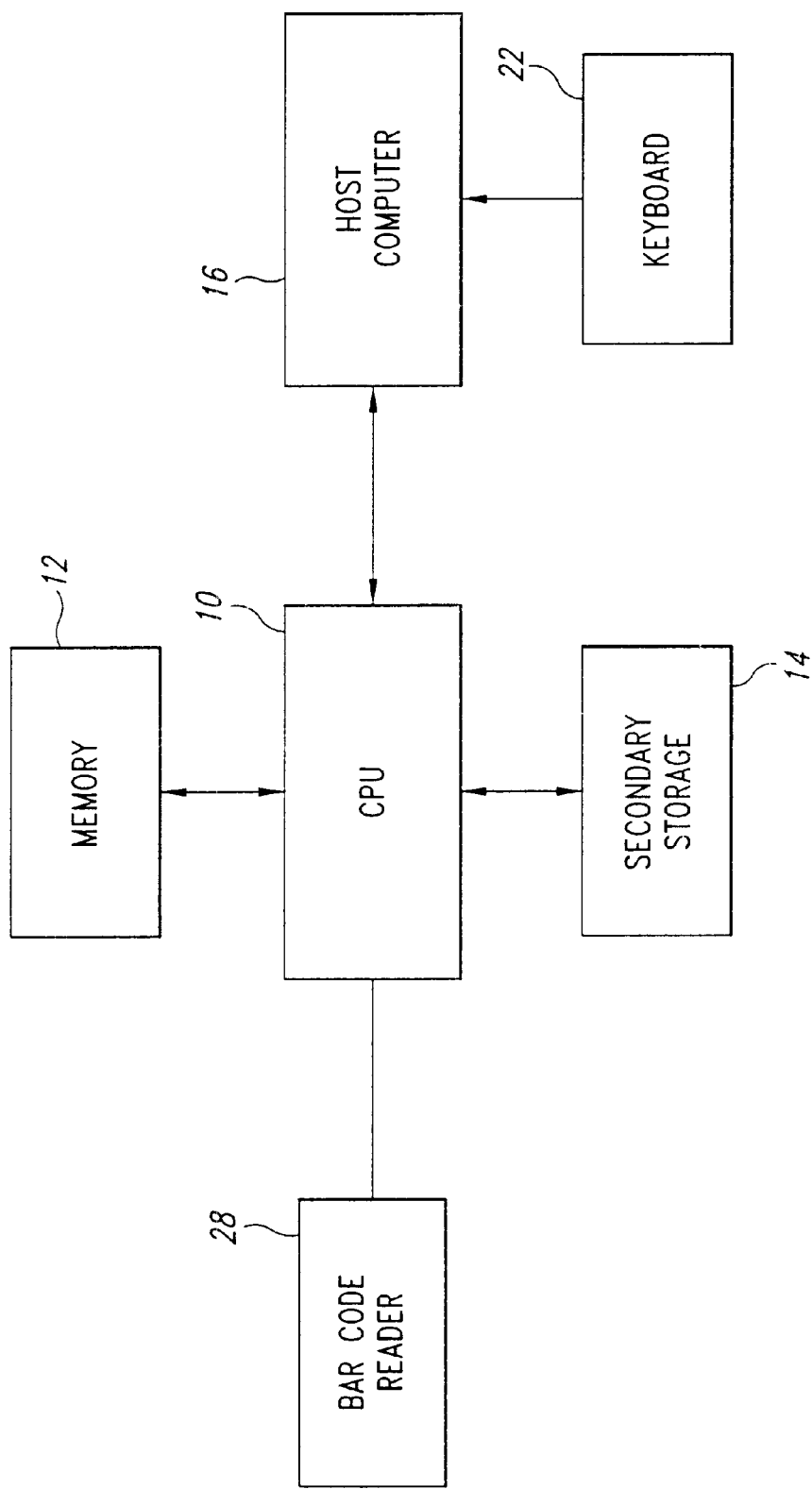
FIG. 7 is a block diagram of a memory device reader of the present invention.

FIG. 7 shows an exemplary embodiment of a system employing the inventive method for decoding a string composed of a plurality of 6-bit character codes. The system includes the CPU 10, memory 12 and secondary storage 14 coupled to the CPU 10. The CPU 10 is in data communication with the 16-bit host computer 16 and a reader 28. The reader 28 includes a device for reading information stored in a data carrier, such as an RF interrogator for reading an RFID tag. The reader 28 will also typcially be capable of writing to the data carrier. As used generally herein, the term "reader" refers to any device capable of reading a data carrier encoding information in a character set. Readers are known by those skilled in the art, and any such reader suitable for use in the present invention can be selected.

The reader 28 interrogates the RFID tag and determines the string of 6-bit character codes. The reader 28 transmits a string of 6-bit values to the CPU 10 along a line 30. The string of 6-bit values correspond to data characters encoded under a small character set, such as 93i. Upon receipt of the string, the CPU 10 executes a set of instructions 32 stored in the memory 12 to convert the 6-bit values into a set of character codes from a larger character set (e.g., 16-bit) for transmission to the host computer 16 along the line 20. Alternatively, the data can be transmitted between the reader 28, and, or the host computer 16 via a wireless link.

Figure 8:
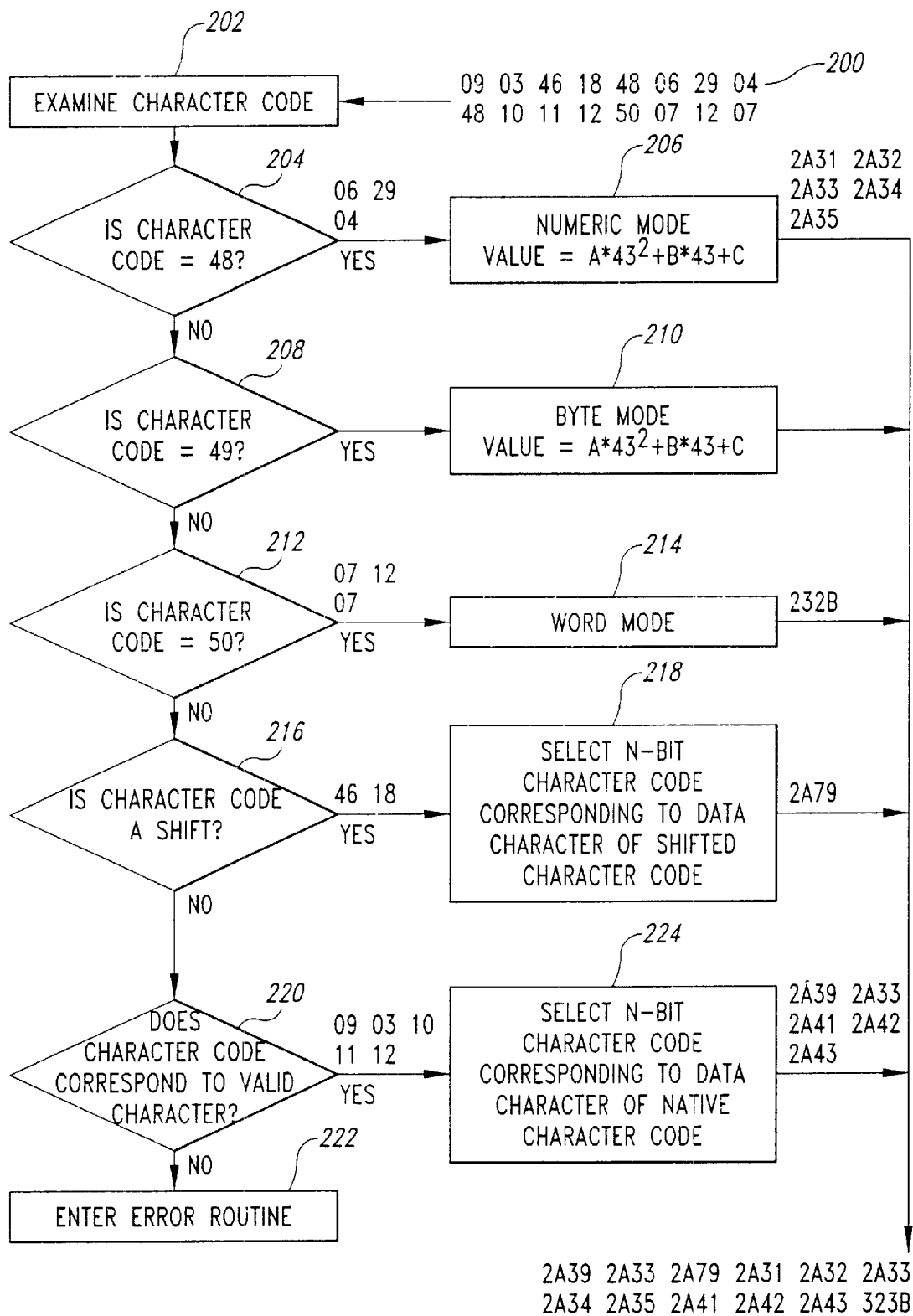
FIG. 8 is a flow chart showing the basic steps performed by the memory device reader of FIG. 6 for reading memory devices under the exemplary embodiment.

FIG. 8 shows an exemplary method performed by the CPU 10 under the set of instructions 32 for decoding the 6-bit values. In step 200, a string of 6-bit values is received from the reader 28. Each of the values correspond to a data character or function in the particular m-bit character set (e.g., 93i). The CPU 10 sequentially evaluates each of the 6-bit character codes and produces a string of 16-bit character codes.

In step 202, the CPU 10 examines a character code. In step 204, the CPU determines whether the character code corresponds to Numeric Mode. If the character code corresponds to Numeric Mode, in step 206 the CPU 10 solves the equality (3) employing the next three character codes as the variable values A, B, and C, respectively. The result (12,345) is converted digit-by-digit into corresponding n-bit character codes, producing the Hexadecimal string: "2A31 2A32 2A33 2A34 2A35."

In step 208, the CPU 10 determines whether the character code corresponds to Byte Mode. If the character code corresponds to Byte Mode, in step 210 the CPU 10 solves the equality (2).

In step 212, the CPU 10 determines whether the character code corresponds to Word Mode. If the character code corresponds to Word Mode, in step 214 the CPU 10 solves the equality (1) employing the three character codes following the Word Mode character code. The resulting value is the corresponding n-bit character code, for example "323B" (Hexadecimal).

In step 216, the CPU 10 determines whether the character code corresponds to a shift character code. If the character code corresponds to a shift character, the CPU 10 in step 218 determines a single n-bit character code that corresponds to the same data character as the shifted m-bit character code. For example, the character code pair "46 18" corresponding to data character "i" in the m-bit character set. The corresponding character code from the n-bit character set is "2A79" (Hexadecimal).

In step 220, the CPU 10 can check to determine whether the character code corresponds to a valid single m-bit character code. If not an error handling routine can be entered in step 222, for example, to terminate processing and report the error to the user. Otherwise, the CPU 10 in step 224 can output an n-bit character code corresponding to the same data character as the m-bit character code.

Figure 10:
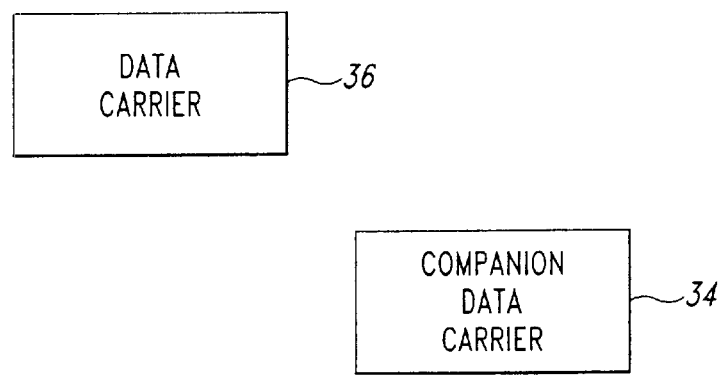
FIG. 10 is a block diagram of a data carrier and a companion data carrier.

The 93i character set includes a Special Features. Flag data character having character code "52" (Decimal) that indicates the existence of a companion data carrier (e.g., an associated data carrier) 34 (FIG. 10) or a function to be performed involving the companion data carrier 34. While in many cases the companion data carrier 34 will take the same form as the data carrier (e.g., both are RF tags) 36 (FIG. 10), the companion data carrier 34 can take a different form than the data carrier 36, for example, the RF tag may have an associated optical tag, touch memory device or machine-readable symbol.

The Special Features Flag can indicate the existence of a companion data carrier 34, for example causing the reader 28 to prompt the user to locate and read the companion data carrier 34. The detection of the Special Features Flag can cause the reader 28 to continue reading (e.g., continue interrogating with a RF signal) until the companion data carrier 34 is read. In a similar aspect, the detection of the Special Features Flag, or absence thereof, can cause the reader 28 to turn off or go into a power saving operating mode to conserve battery power.

Detection of the Special Features Flag can cause the reader 28 to generate an alert, for example where the data carrier 36. marks dangerous goods. Additionally, or alternatively, detection of the Special Features Flag can indicate a more complex operation, such as causing the reader 28 to perform an ordered concatenation or structured append on the data from the data carrier 36 and companion data carrier 34. Thus, data from two different data carriers 34, 36 can be joined in an ordered fashion. Detection of the Special Features Flag can also cause the reader 28 to download read information to a host computer or to require a security handshake with the reader 28 and/or user. Security handshaking is generally known in the art and need not be discussed in detail.

One or more "modifier" character codes can follow the initial Special Features Flag character code to identify the data carrier 36 as a member of a group of separate data carriers that together form one collective data carrier, or provide specific reader instructions to assist in the decode and data management of one or more companion data carriers 34. For example, the modifier character code can indicate the type of companion data character 34 where the data carrier 36 and companion data carriers 34 are of different types (e.g., RFID tag and touch memory). The modifier character code can also indicate a encoding scheme for data in the companion data carrier 34, or can indicate one of a number of operations that the reader 28 is to perform. Additionally, or alternatively, the Special Feature Flag character or the shift mode characters can be located at the end of the data, or at some predefined location within the string of data.

Figure 11:
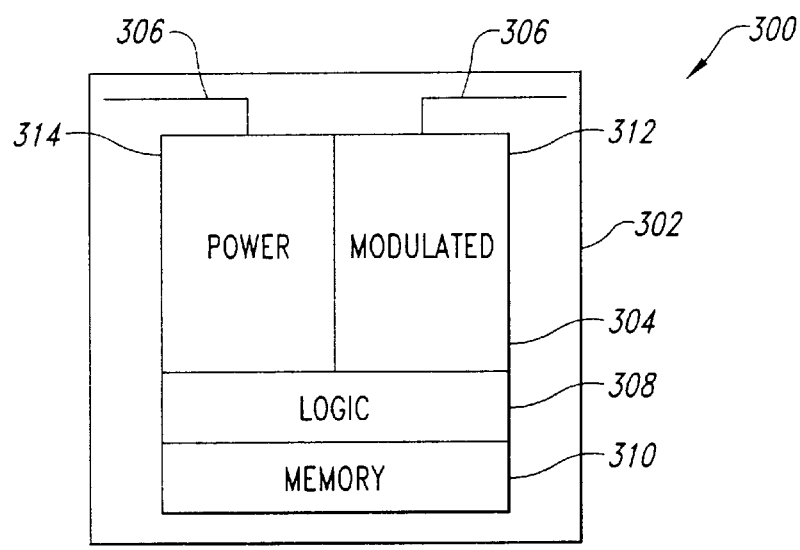
FIG. 11 is a functional block diagram of an exemplary RFID tag.

A passive RFID tag 300 is shown in block diagram form in FIG. 11. The RFID tag 300 includes a substrate 302 that carries an integrated circuit 304 and an antenna 306 coupled to the integrated circuit 304. The integrated circuit 304 includes logic 308, memory circuits 310, modulation circuits 312 and power circuits 314. The logic and memory circuits may be formed as digital circuits, while the modulation and power circuits may be formed as analog circuits, although such is not required.

The modulation circuits may form an RF detector and/or an RF emitter for respectively receiving, and transmitting (or transponding) a modulated signal through the antenna 306. The RF detector and the RF emitter can be integrally formed in the integrated circuit 304 as an RF transceiver, coupled to the common dipole antenna 306. Alternatively, the RF detector can take the form of an RF receiver and an RF transmitter, each coupled to a respective antenna (not shown).

The logic 308 can take the form of microcode or can be implemented as a hardwired circuit. The power circuits 314 converts an RF signal received at the antenna 306 to a DC voltage which powers up the logic 308 and transmits information and commands for storing and retrieving data to and from the memory circuits 310. The digital circuit generally executes all of the functions performed by the RFID tag 300, such as retrieving stored data from the memory circuits 310 and modulating the RF signal to transmit the retrieved data. A protective housing can enclose the components. While the RFID tag 300 shown is a passive device, a self-powered active device may employed. The logic 302, for example in the form of a programmed microprocessor or microcontroller, controls data transfer and electrical operation of the RFID tag 300 in a manner known in the art using a manufacture-identified protocol.

Although specific embodiments of, and examples for, the present invention have been described above for illustrative purposes, various equivalent modifications can be made without departing from the spirit and scope of the invention. For example, if the memory 12 is sufficiently large to contain all data required by the CPU 10 for encoding and decoding the data carriers, the secondary storage 14 is unnecessary and thus eliminated. Alternatively, the data required by the CPU 10 can be contained in the secondary storage 14, thus eliminating the need for a large memory 12 or the need for this memory entirely. One skilled in the art will appreciate that as used herein the terms memory and secondary storage can apply to any type of computer-readable media that can store data accessible by a computer including, but not limited to, a hard disk, optical disk, magnetic disk, magnetic cassettes, flash memory cards, digital video disks ("DVD"), RAMs, ROMs, smart cards, etc. Regarding the 93i character set, the character codes can be allocated to different data characters than as described above with respect to FIG. 1.

While the exemplary embodiment is often discussed in terms of double byte (16-bit) and single byte (8-bit) characters and codes, one skilled in the art will recognize that the system and methods disclosed will work for character sets that encode a smaller character set therein. That is, the method can be employed where the number of bits required to represent a character from a smaller character set is smaller than the number of bits required to represent a character from a larger character set that includes the characters of the smaller character set therein. The assignment of 8-bits to a byte and 16-bits to a word is a convenient convention for digital computers. The terms byte, single byte and double byte do not have to necessarily correspond to 8-bits and 16-bits, respectively. They could apply equally well to, for example 16-bit and 32-bit segments, or 5-bit and 10-bit segments. Alternatively, as used in the specification and claims, a double byte does not necessarily contain twice as many bits as a single byte. For example, a double byte system of 16-bit characters can encode a single byte system such as ASCII, which only requires 7-bits in the unextended version.

Additionally, the present invention can incorporate the teachings of the U.S. Patents and/or applications described herein to provide additional benefits and functionality. For example, commonly assigned U.S patent applications: U.S. Ser. No. 09/177,679, filed Oct. 22, 1998, and entitled "ERROR CORRECTION ENHANCEMENT FOR CODE 93i AND OTHER MACHINE-READABLE SYMBOLOGIES" (Atty. Docket No. 480062.628); and U.S. Ser. No.

09/228,467, filed Jan. 11, 1999, and entitled "METHOD AND APPARATUS FOR STORING INFORMATION IN A NUMBER OF MEMORY DEVICES, SUCH AS RFID TAGS" (Atty. Docket No. 480062.629). The U.S. Patents and applications cited above are incorporated herein by reference as if set forth in their entirety. Features of the present invention can be applied to other character sets. Furthermore, aspects of the method have been generally described herein as being incorporated into a 6-bit character set, 93i; alternatively, such aspects of the method can be employed in a smaller and/or larger character set, such as a 5-bit or 7-bit character set.

These and other changes can be made to the invention in light of the above detailed description. In general, in the following claims, the terms should not be construed to limit the invention to the specific embodiments disclosed in the specification and claims, but should be construed to include all apparatus, methods and character sets for directly encoding and decoding various data characters between different sized character sets and character sets that include character codes representing function, operations and/or shifting. Accordingly, the invention is not limited by the disclosure, but instead its scope is to be determined entirely by the following claims.

What is claimed is:

1. A method of encoding a string of data characters into a wireless, programmable RFID tag, comprising:

determining a number of n-bit character codes corresponding to the data characters in the string, the character codes selected from an n-bit set character set that maps a plurality of human readable data characters to respective n-bit character codes, where a subset of the human readable data characters form an m-bit character set that maps the human readable data characters in the subset to respective m-bit character codes, where m is less than n;

parsing the number of n-bit character codes to separate the n-bit character codes corresponding to the data characters in the subset from the n-bit character codes corresponding to the data characters not in the subset;

converting the parsed n-bit character codes corresponding to the data characters in the subset into corresponding m-bit character codes, and outputting an output string of the m-bit character codes corresponding to data characters in the subset and the n-bit character codes corresponding to data characters not in the subset to program the RFID tag.

2. The method of claim 1 wherein outputting an output string includes operating an RF transmitter based on the character codes to program the RFID tag.

3. The method of claim 1 wherein parsing the number of n-bit character codes includes examining an at least one bit position of the n-bit character code for a predefined value.

4. The method of claim 1 wherein the n-bit character set is GB and the m-bit character set is ASCII, and wherein parsing the number of n-bit character codes includes examining the n-bit character codes for predefined string equal to Hexadecimal 2A.

5. The method of claim 1 wherein the n-bit character codes have 16 bits and the m-bit character codes have at most 8 bits.

6. The method of claim 1, further comprising:

inserting an m-bit character code proximate a string of n-bit character codes, the m-bit character code identifying a change from m-bit encoding to n-bit encoding.

7. The method of claim 1, further comprising:

inserting an n-bit character code proximate a string of m-bit character codes, the n-bit character code identifying a change from n-bit encoding to m-bit encoding.

8. A method of encoding a string of data characters into a memory, comprising:

determining a number of n-bit character codes corresponding to the data characters in the string, the character codes selected from an n-bit set character set that maps a plurality of human readable data characters to respective n-bit character codes, where a subset of the human readable data characters form an m-bit character set that maps the human readable data characters in the subset to respective m-bit character codes, where m is less than n; and for at least one of the data characters in the string, substituting the respective m-bit character code for the n-bit character code of at least one of the data characters that is in the subset.

9. The method of claim 8, further comprising:

operating an RF transmitter based on the string of character codes including the n-bit character codes substituted for the m-bit character codes to program the memory device.

10. The method of claim 8, further comprising:

parsing the n-bit character codes to separate the n-bit character codes corresponding to characters in the m-bit set from the n-bit character codes of characters not in the m-bit character set.

11. The method of claim 8 wherein the n is equal to 16 and m is equal to or less than 8.

12. A method of decoding an input string of character codes from a wireless, programmable memory device, comprising:

receiving the input string of n-bit and m-bit character codes selected from an n-bit character set that maps a plurality of human readable data characters to respective n-bit character codes, and an m-bit character set that maps a subset of the plurality of human readable data characters to respective m-bit character codes, where m is less than n;

parsing the input string of n-bit and m-bit character codes to separate the n-bit character codes from the m-bit character codes;

converting the m-bit character codes into corresponding n-bit character codes; and assembling the n-bit character codes corresponding to the data characters in the input string that are contained in the subset and the n-bit character codes corresponding to the data characters in the input string that are not contained in the subset into an output string of n-bit character codes.

13. The method of claim 12, further comprising:

transmitting an interrogation signal to the memory device;

receiving an RF response signal form the memory device; and converting the RF response signal into the input string.

14. The method of claim 12 wherein parsing the input string includes checking at least one bit position in the character codes for a predetermined value to identify the m-bit characters from the n-bit characters.

15. The method of claim 12 wherein parsing the input string includes comparing the value of at least a portion of the character code to a predetermined value to identify the m-bit characters from the n-bit characters.

16. The method of claim 12 wherein parsing the input string includes comparing the value of a functional character code to a predetermined value to identify the m-bit characters from the n-bit characters.

17. The method of claim 12 wherein converting the m-bit character codes into corresponding n-bit character codes includes:

searching a conversion table of m-bit character codes to find the n-bit character code corresponding to a same human readable data character as the m-bit character code.

18. The method of claim 12 wherein converting the m-bit character codes into corresponding n-bit character codes includes:

searching a conversion table of m-bit character codes to find a portion of the n-bit character code corresponding to a same human readable data character as the m-bit character code; and appending a base value to the portion of the corresponding n-bit character code to define the corresponding n-bit character code.

19. The method of claim 12 wherein converting the m-bit character codes into corresponding n-bit character codes includes:

searching a conversion table of m-bit character codes for an offset value corresponding to a same human readable data character as the m-bit character code; and adding the offset value to a base value to define the corresponding n-bit character code.

20. The method of claim 12 wherein converting the m-bit character codes into corresponding n-bit character codes includes:

calculating the corresponding n-bit character code from a formula.

21. A method of decoding an input string of character codes from a wireless, programmable memory device, comprising:

receiving the input string of n-bit and m-bit character codes selected from an n-bit character set that maps a plurality of human readable data characters to respective n-bit character codes and an m-bit character set that maps a subset of the plurality of human readable data characters to respective m-bit character codes, where m is less than n; and for at least one of the m-bit character codes in the input string, substituting the n-bit character code from the n-bit character set that corresponds to the same human readable data character as the at least one m-bit character code.

22. The method of claim 21, further comprising:

interrogating the memory device with an RF interrogation signal;

receiving an RF response signal form the memory device; and converting the RF response signal into the input string.

23. The method of claim 21 wherein substituting the n-bit character code, includes:

searching a conversion table of m-bit character codes to find the n-bit character code corresponding to a same human readable data character as the m-bit character code.

24. The method of claim 21 wherein substituting the n-bit character code, includes:

searching a conversion table of m-bit character codes to find a portion of the n-bit character code corresponding to a same human readable data character as the m-bit character code; and appending a base value to the portion of the corresponding n-bit character code to define the corresponding n-bit character code.

25. The method of claim 21 wherein substituting the n-bit character code, includes:

searching a conversion table of m-bit character codes for an offset value corresponding to a same human readable data character as the m-bit character code; and adding the offset value to a base value to define the corresponding n-bit character code.

26. The method of claim 21 wherein substituting the n-bit character code, includes:

calculating the corresponding n-bit character code from a formula.

27. A computer readable medium whose contents cause a computer system to encode a string of data characters into a memory by:

determining a number of n-bit character codes corresponding to the data characters in the string, the character codes selected from an n-bit set character set that maps a plurality of human readable data characters to respective n-bit character codes, where a subset of the human readable data characters from an m-bit character set that maps the human readable data characters in the subset to respective m-bit character codes, where m is less than n; and for at least one of the data characters in the string, substituting the respective m-bit character code for the n-bit character code of at least one of the data characters that is in the subset.

28. A computer readable medium whose contents cause a computer system to decode a string of data characters from a memory by:

receiving the input string of n-bit and m-bit character codes selected from an n-bit character set that maps a plurality of human readable data characters to respective n-bit character codes, and an m-bit character set that maps a subset of the plurality of human readable data characters to respective m-bit character codes, where m is less than n; and for at least one of the m-bit character codes in the input string, substituting the n-bit character code from the n-bit character set that corresponds to the same human readable data character as the at least one m-bit character code.

* * * * *